(12) United States Patent
Vermeersch et al.

(10) Patent No.: US 11,187,320 B2
(45) Date of Patent: Nov. 30, 2021

(54) SHIFT SYSTEM THEFT PROTECTION FEATURE

(71) Applicant: STEERING SOLUTIONS IP HOLDING CORPORATION, Saginaw, MI (US)

(72) Inventors: Michael C. Vermeersch, Flushing, MI (US); Arthur W. Nellett, Davison, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 490 days.

(21) Appl. No.: 16/032,694

(22) Filed: Jul. 11, 2018

(65) Prior Publication Data
US 2020/0018392 A1 Jan. 16, 2020

(51) Int. Cl.
*F16H 61/22* (2006.01)
*B60R 25/021* (2013.01)
*F16H 59/10* (2006.01)
*F16H 59/02* (2006.01)

(52) U.S. Cl.
CPC ....... *F16H 61/22* (2013.01); *B60R 25/02144* (2013.01); *F16H 59/0204* (2013.01); *F16H 59/10* (2013.01); *F16H 2059/0247* (2013.01)

(58) Field of Classification Search
CPC ...... F16H 59/02; F16H 59/10; F16H 59/0204; F16H 2059/0247; F16H 2059/0282; F16H 2061/223; F16H 2061/226; F16H 61/22; B60K 20/06; B60R 25/066; B60R 25/02144
USPC .......................... 70/193–197, 245–248, 254; 180/287–289; 74/473.21–473.28, 74/473.31–473.32
See application file for complete search history.

(56) References Cited

U.S. PATENT DOCUMENTS

| 4,934,208 A * | 6/1990 | Carlstrom | B60K 20/06 116/28.1 |
| 2002/0166715 A1* | 11/2002 | Tomago | B60R 21/045 180/443 |
| 2003/0205100 A1* | 11/2003 | Vermeersch | B60R 25/02144 74/473.32 |
| 2005/0067825 A1* | 3/2005 | Manwaring | B60Q 1/1469 280/777 |

\* cited by examiner

*Primary Examiner* — Victor L Macarthur
(74) *Attorney, Agent, or Firm* — Dickinson Wright PLLC

(57) ABSTRACT

A steering column assembly includes a jacket assembly, a modular shift assembly, and a mounting bracket. The jacket assembly extends along a first axis. The modular shift assembly includes a shift bracket and a shift gate. The shift bracket is connected to the jacket assembly and defines a shift bracket opening. The shift gate is disposed on the shift bracket. The bracket defines a shift gate opening as well as first and second detents that extend from the shift gate opening. The mounting bracket is disposed on the shift bracket and has a tab that overlaps a portion of the shift gate.

11 Claims, 4 Drawing Sheets

SHIFT SYSTEM THEFT PROTECTION FEATURE

BACKGROUND

Vehicles are provided with a shift system that is operable to select or shift gears of a vehicle transmission. The shift system may be mounted to a vehicle steering column and is operatively connected to the vehicle transmission through a control mechanism. The shift system may include a lever that may be utilized by an unscrupulous person to overload a portion of the shift system to abscond with the vehicle.

SUMMARY

Disclosed is a steering column assembly that includes a jacket assembly, a modular shift assembly, and a mounting bracket. The jacket assembly extends along a first axis. The modular shift assembly includes a shift bracket and a shift gate. The shift bracket is connected to the jacket assembly and defines a shift bracket opening. The shift gate is disposed on the shift bracket. The bracket defines a shift gate opening as well as first and second detents that extend from the shift gate opening. The mounting bracket is disposed on the shift bracket and has a tab that overlaps a portion of the shift gate.

Also disclosed is a modular shift assembly for a steering column assembly. The modular shift assembly includes a shift gate and a mounting bracket. The shift gate is disposed on a shift bracket and defines a shift gate opening through which a shift lever clevis tip extends and a first detent arranged to receive the shift lever clevis tip. The mounting bracket is disposed on the shift bracket. The mounting bracket has a tab that extends towards the shift gate opening and is disposed proximate the first detent.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
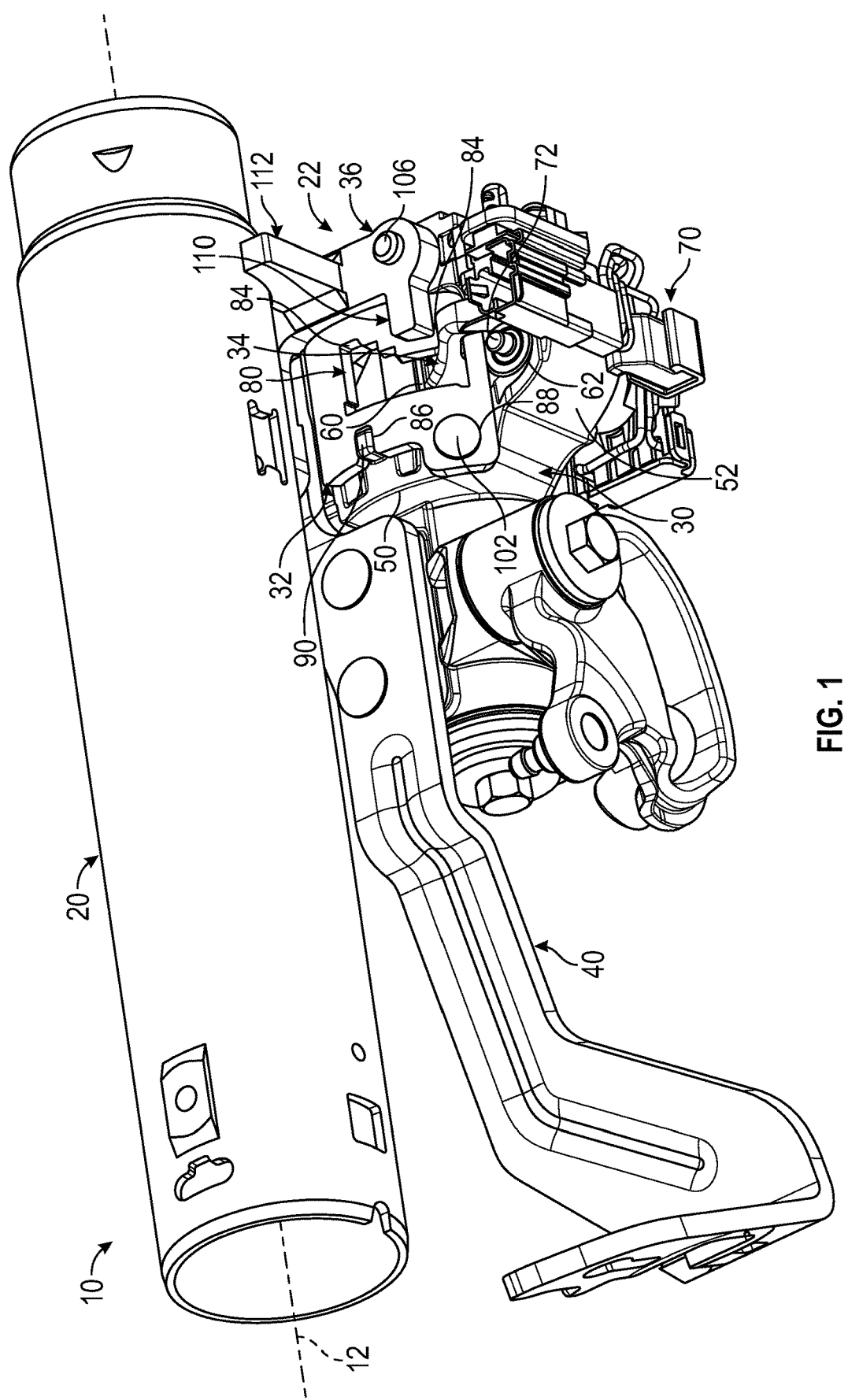
FIG. 1 is a perspective view of a steering column assembly.

Referring to FIG. 1, a steering column assembly 10 may be an adjustable steering column assembly that is adjustable along a first axis 12 or movable relative another axis that is disposed generally transverse to the first axis 12. The steering column assembly 10 includes a jacket assembly 20 and a modular shift assembly 22.

The jacket assembly 20 extends along the first axis 12 and may be extendable or collapsible along the first axis 12.

The modular shift assembly 22 is connected to the jacket assembly 20. The modular shift assembly 22 is at least partially offset from the first axis 12. The modular shift assembly 22 is arranged to facilitate the shifting or changing of a transmission state or position. The modular shift assembly 22 includes a shift bracket 30, a shift gate 32, a shift lever clevis tip 34, and a mounting plate or mounting bracket 36.

The shift bracket 30 is connected to the jacket assembly 20. The shift bracket 30 may be directly connected to the jacket assembly 20 may be connected to the jacket assembly 20 through a cable bracket 40.

The shift bracket 30 includes a first shift bracket portion 50 and a second shift bracket portion 52. The first shift bracket portion 50 defines a shift bracket opening 60 that extends completely through the first shift bracket portion 50. The second shift bracket portion 52 extends from the first shift bracket portion 50.

The second shift bracket portion 52 defines a first mounting feature 62 and the second mounting feature 64. The first mounting feature 62 extends along an axis that is disposed generally parallel to the axis along which the shift bracket opening 60 extends. The second mounting feature 64 extends along another axis that is disposed generally transverse to the axis along which the shift bracket opening 60 extends. The second mounting feature 64 extends along another axis that is disposed generally parallel to the first axis 12.

Figure 2:
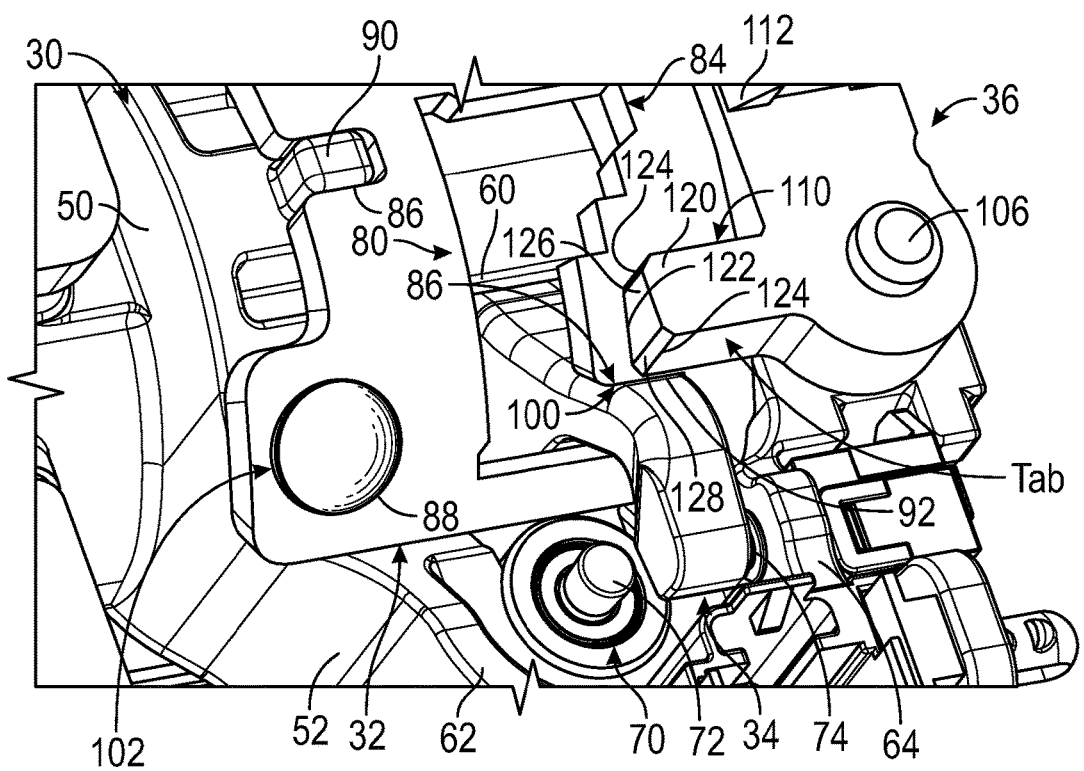
FIG. 2 is a partial view of a portion of the modular shift assembly of the steering column assembly.
Figure 4:
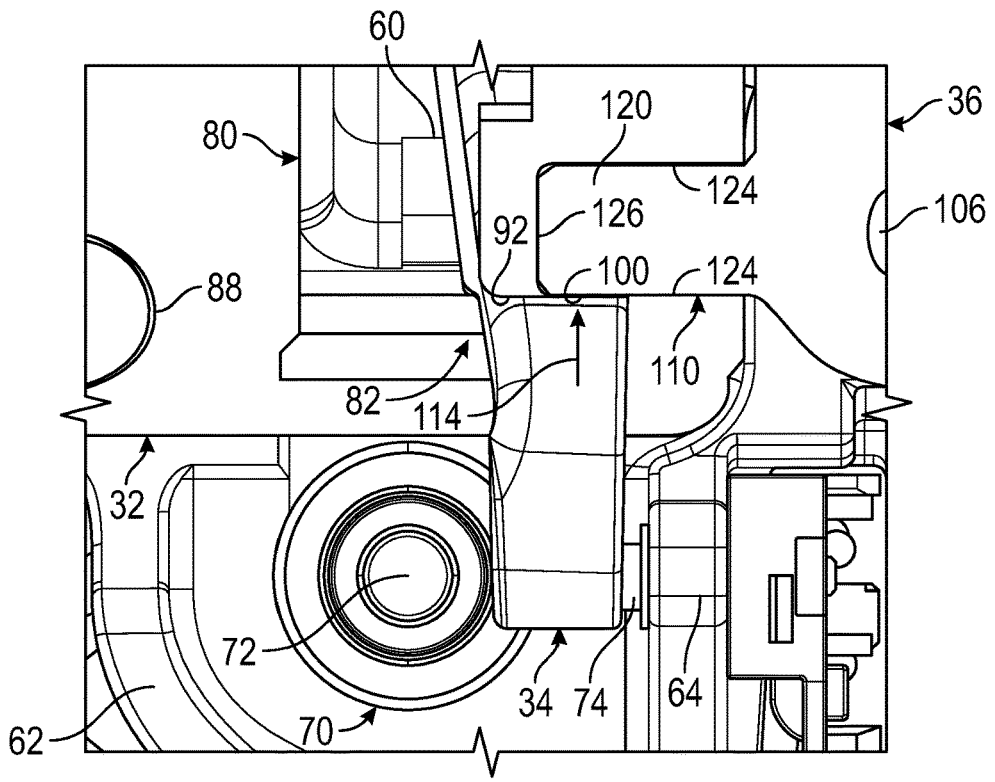
FIGS. 4-6 are views of the modular shift assembly having a shift system theft protection feature inhibiting theft.
Figure 5:
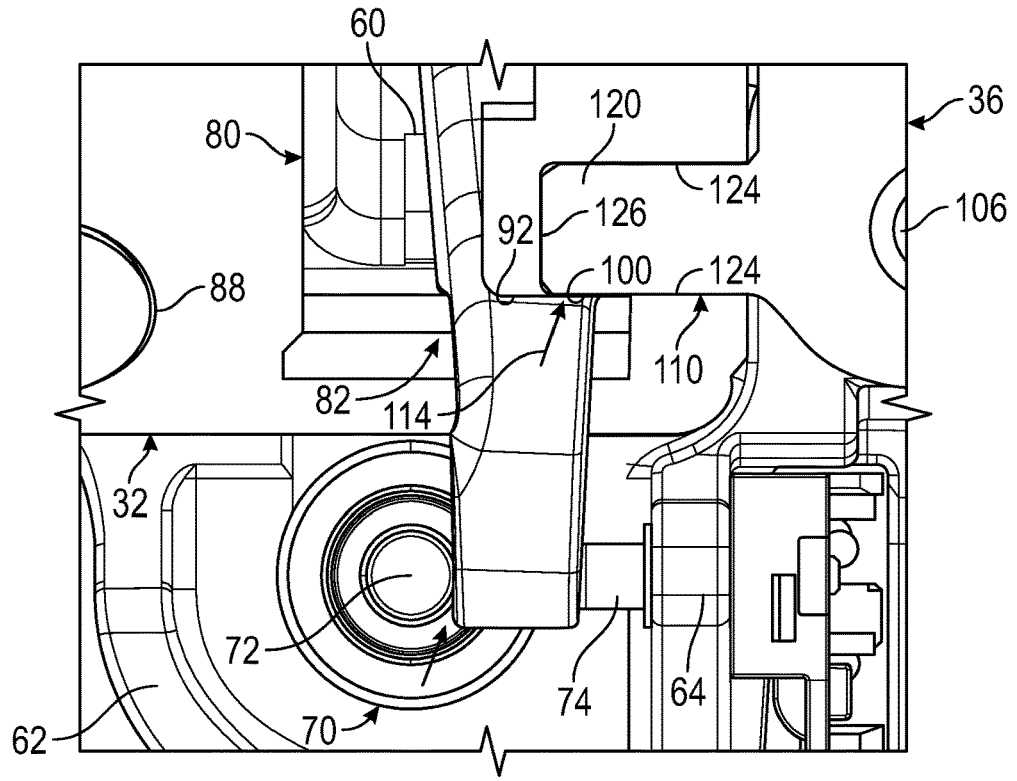
Figure 6:
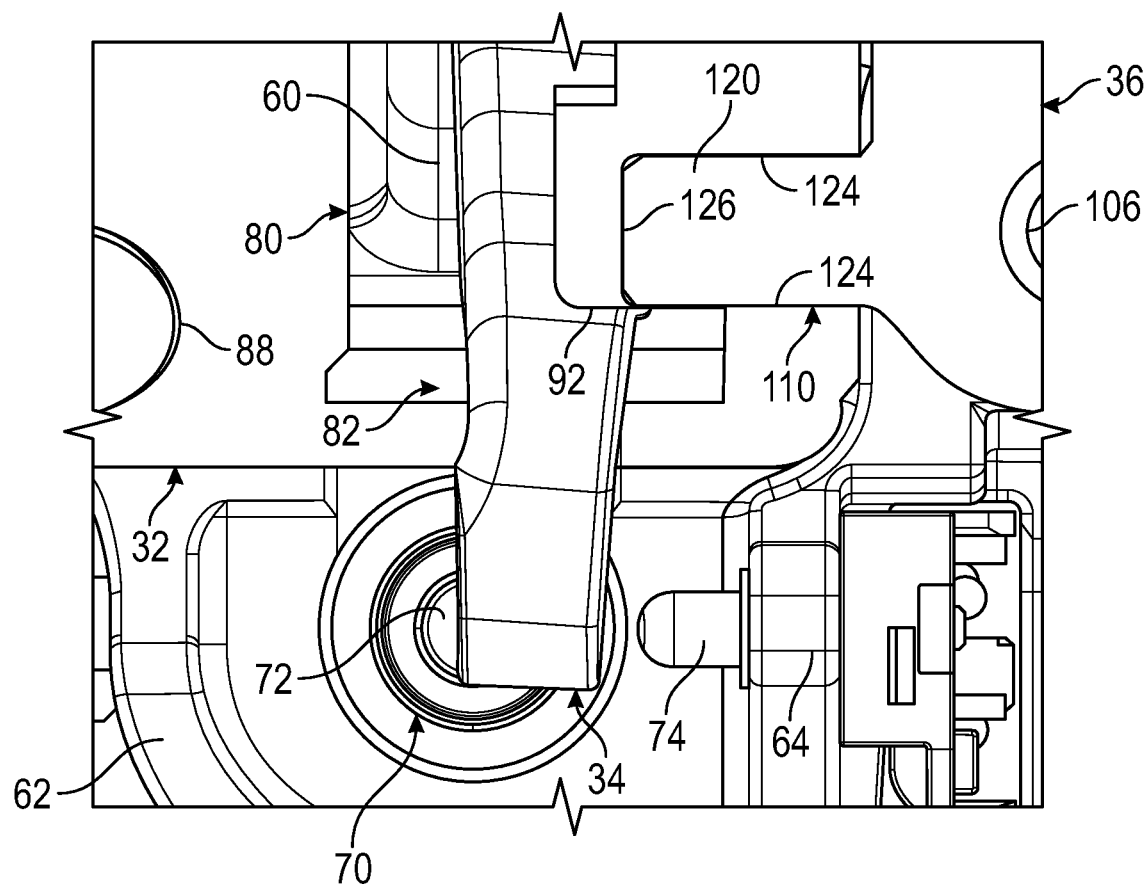

A brake transmission shift interlock device (BTSI) 70 is connected to the second shift bracket portion 52. The BTSI 70 includes a pin 72 and a switch 74. The pin 72 extends through the first mounting feature 62. The pin 72 is movable between an extended position and a retracted position. The pin 72, while in the extended position, inhibits the shift lever clevis tip 34 from moving out of a park position, as shown in FIGS. 2, 4, and, 5. The pin 72, while in the retracted position, facilitates or enables the shift lever clevis tip 34 to move out of the park position, as shown in FIG. 6.

The switch 74 extends through the second mounting feature 64. The end of the shift lever clevis tip 34 is arranged to selectively engage the switch 74, as shown in FIGS. 2 and 4-6. Engagement between the shift lever clevis tip 34 and the switch 74 provides a signal indicative of the shift lever clevis tip 34 being in the park position.

The shift gate 32 may be at least partially disposed between the cable bracket 40 and the shift bracket 30. The shift gate 32 is disposed on the shift bracket 30. The shift gate 32 may be considered a detent plate that defines a shift gate opening 80, a first detent 82, a second detent 84, a notch 86, and a mounting hole 88.

The shift gate opening 80 is disposed over and is proximately aligned with the shift bracket opening 60 such that the shift lever clevis tip 34 extends through the shift gate opening 80 and the shift bracket opening 60.

The first detent 82 and the second detent 84 each extend from the shift gate opening 80 towards the mounting bracket 36. The first detent 82 and the second detent 84 are each arranged to receive a portion of the shift lever clevis tip 34. The first detent 82 may correspond to a park position, P, of a transmission. The second detent 84 may correspond to a non-park position of a transmission, such as a reverse position, R, a neutral position, N, a drive position, D, and/or another drive position, M/D1.

Figure 3:
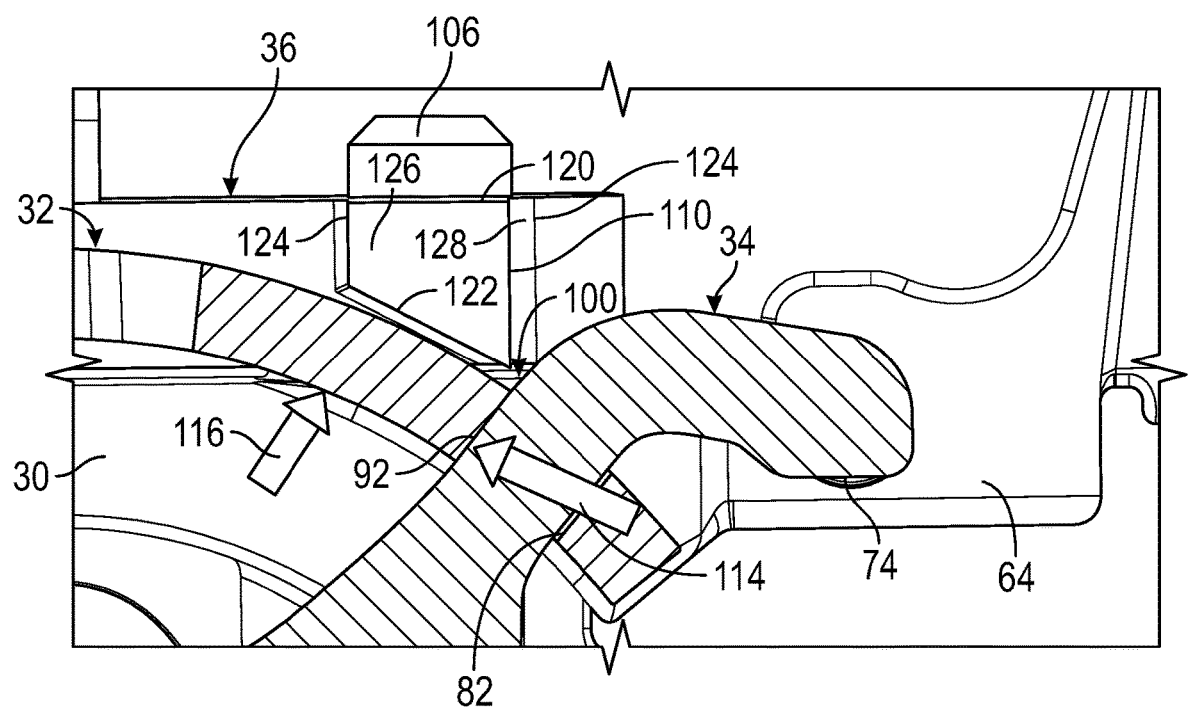
FIG. 3 is a partial cross-section of the modular shift assembly.

Referring to FIGS. 2 and 3, the notch 86 extends from a side of the shift gate 32 towards the shift gate opening 80. The notch 86 is arranged to receive a protrusion 90 that extends from the first shift bracket portion 50, to locate the shift gate 32 relative to the shift lever clevis tip 34.

The mounting hole 88 is disposed proximate a corner of the shift gate 32. The mounting hole 88 is arranged to receive a fastener 102 to couple the shift gate 32 to the first shift bracket portion 50 of the shift bracket 30. In at least one embodiment, an additional fastener may be disposed proximate an opposing corner such that the additional fastener is disposed proximate the shift gate 32 and a portion of the mounting bracket 36.

Referring to FIGS. 1-3, the shift lever clevis tip 34 extends at least partially through the shift bracket opening 60 and the shift gate opening 80. The shift lever clevis tip 34 is arranged to be received by or disposed proximate at least one of the first detent 82 and the second detent 84. The shift lever clevis tip 34 may be provided as a portion of a shift clevis that is operatively connected to or integrally formed with a shift lever. An operator of the vehicle may move the shift lever such that the shift lever clevis tip 34 moves between the various detents that correspond to various transmission positions.

An interface 100 is defined between a surface 92 of the shift gate 32 that at least partially defines the first detent 82 and a portion of the shift lever clevis tip 34, while the shift lever clevis tip 34 is at least partially received within the first detent 82. The forcible rotation of the shift lever clevis tip 34 may overload or yield a portion of the shift gate 32 proximate the interface 100 enabling the shift lever clevis tip 34 to be moved from the first detent 82 towards the second detent 84 without the pin 72 of the BTSI 70 being retracted. The mounting bracket 36 is provided with a feature that functions as a redundant over travel stop that reinforces the interface 100 between the shift lever clevis tip 34 and the surface 92 of the shift gate 32 to inhibit the forcible rotation of the shift lever clevis tip 34 from overloading or yielding portions of the shift gate 32.

Referring to the Figures, the mounting bracket 36 is disposed on the shift bracket 30 and is connected to the shift bracket 30 by a fastener 106. The mounting bracket 36 includes a tab 110 and a weldment 112.

The tab 110 acts as a shift system theft protection feature that inhibits the shift lever clevis tip 34 from being used to override the BTSI 70 interlock or blocking features. The tab 110 overlaps a portion of the shift gate 32 that is disposed opposite the mounting hole 88. The tab 110 extends towards the shift bracket opening 60 and towards the shift gate opening 80 along the first axis 12. The tab 110 is disposed proximate the surface 92 of the first detent 82 of the shift gate 32. The tab 110 is arranged to reinforce the interface 100 and defines a deflection travel stop for at least one of the shift gate 32 and the shift lever clevis tip 34. The deflection travel stop is arranged to inhibit the shift lever clevis tip 34 from deforming or overloading the shift gate 32 responsive to the shift lever clevis tip 34 being forcibly moved from the first detent 82 towards the second detent 84.

As shown in FIG. 3, a radial force 114 may attempt to lift a corner of the shift gate 32 opposite the mounting hole 88. The tab 110 creates the deflection travel stop in direction 116, which transfers the stress back to the shift lever creating an intentional design fuse that enables the shift lever that is connected to the shift lever clevis tip 34 to fail or yield prior to the interface 100 yielding or deforming.

Referring to FIGS. 2 and 3, the tab 110 includes a first surface 120, a second surface 122 that is disposed opposite the first surface 120, a pair of side surfaces 124 that extend between the first surface 120 and the second surface 122, and an end surface 126. The second surface 122 is disposed in a non-parallel and non-perpendicular relationship with the first surface 120. The second surface 122 faces towards and is disposed proximate a surface of the shift gate 32. The pair of side surface 124 are disposed parallel to the surface 92 of the first detent 82 of the shift gate 32. The end surface 126 extends between distal ends of the first surface 120, the second surface 122, and the pair of side surfaces 124. A chamfer 128 extends between the end surface 126, a side surface of the pair of side surfaces 124, the first surface 120, and the second surface 122.

The weldment 112 is spaced apart from the tab 110. The weldment 112 extends along an axis that is disposed transverse to the first axis 12 such that the weldment 112 is disposed perpendicular to the tab 110. The weldment 112 is arranged to engage the jacket assembly 20.

The tab 110 of the mounting bracket 36 of the modular shift assembly 22 of the present disclosure facilitates the transfer of stresses from an interface 100 between the shift lever clevis tip 34 and a surface 92 of the shift gate 32 to a lever of the shift lever clevis tip 34 during a severe high load theft attempt. The tab 110 structurally reinforces the interface 100 to prevent override of the pin 72 of the BTSI 70 during the severe high load theft attempt. The tab 110 also restricts movement of the shift lever clevis tip 34 by engaging the shift lever clevis tip 34.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering column assembly, comprising:
    a jacket assembly that extends along a first axis;
    a modular shift assembly, comprising:
    a shift bracket connected to the jacket assembly, the shift bracket defining a shift bracket opening, and
    a shift gate disposed on the shift bracket, the shift gate defining a shift gate opening and first and second detents extending from the shift gate opening; and
    a mounting bracket disposed on the shift bracket, the mounting bracket having a tab that at least partially overlaps a portion of the shift gate located between the first detent and the second detent.

2. The steering column assembly of claim 1, wherein the tab extends towards the shift bracket opening and is disposed proximate the first detent.

3. The steering column assembly of claim 1, wherein a shift lever clevis tip at least partially extends through the shift bracket opening and the shift gate opening and is disposed proximate at least one of the first detent and the second detent.

4. The steering column assembly of claim 3, wherein an interface is defined between a surface of the shift gate and the shift lever clevis tip while the shift lever clevis tip is received within the first detent.

5. The steering column assembly of claim 4, wherein the tab is arranged to extend along and reinforce the interface.

6. The steering column assembly of claim 4, wherein the tab defines a deflection travel stop for at least one of the shift gate and the shift lever clevis tip.

7. The steering column assembly of claim 4, wherein the tab includes a first surface, a second surface disposed opposite the first surface, and a pair of side surfaces extending between the first surface and the second surface.

8. The steering column assembly of claim 7, wherein the second surface is disposed in a non-parallel and non-perpendicular relationship with the first surface.

9. The steering column assembly of claim 8, wherein the second surface faces towards and is disposed proximate a surface of the interface.

10. The steering column assembly of claim 1, wherein the mounting bracket defines a weldment that is spaced apart from tab.

11. The steering column assembly of claim 10, wherein the weldment is arranged to engage the jacket assembly.

\* \* \* \* \*